United States Patent
Sudo et al.

(10) Patent No.: US 7,052,264 B2
(45) Date of Patent: May 30, 2006

(54) MOLDING METAL MOLD, METHOD OF PRODUCING MOLDING METAL MOLD, AND ARTICLES MOLDED BY MOLDING METAL MOLD

(75) Inventors: Yoshihiro Sudo, Saitama (JP); Akio Komori, Tokyo (JP); Hideki Ohtawa, Saitama (JP); Katsuharu Ohtsuki, Kanagawa (JP); Taku Sunouchi, Saitama (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 10/257,427

(22) PCT Filed: Feb. 13, 2002

(86) PCT No.: PCT/JP02/01205

§ 371 (c)(1),
(2), (4) Date: Apr. 21, 2003

(87) PCT Pub. No.: WO02/064344

PCT Pub. Date: Aug. 22, 2002

(65) Prior Publication Data
US 2003/0175379 A1    Sep. 18, 2003

(30) Foreign Application Priority Data
Feb. 15, 2001 (JP) .................... 2001-38130

(51) Int. Cl.
*B29C 43/32* (2006.01)
*B29C 45/26* (2006.01)

(52) U.S. Cl. .............. 425/188; 29/700; 249/102; 425/183; 425/195

(58) Field of Classification Search ........... 425/182, 425/183, 188, 193, 423, 195; 264/328.1, 264/272.17; 249/102; 29/700
See application file for complete search history.

(56) References Cited

U.S. PATENT DOCUMENTS

| | | | | |
|---|---|---|---|---|
| 2,982,997 A * | 5/1961 | Peickii et al. | ............... | 425/193 |
| 3,470,281 A * | 9/1969 | Knowles | .................... | 264/551 |
| 3,522,633 A * | 8/1970 | Cubitt | ......................... | 425/193 |
| 4,979,720 A * | 12/1990 | Robinson | .................... | 249/103 |
| 5,297,951 A * | 3/1994 | Asai | .......................... | 425/556 |
| 5,648,106 A * | 7/1997 | Miyairi et al. | ............. | 425/186 |
| 6,015,514 A * | 1/2000 | Koseko | ...................... | 264/40.1 |
| 6,132,652 A | 10/2000 | Higuchi et al. | ............ | 264/1.7 |
| 6,165,407 A | 12/2000 | Tahara et al. | ........... | 264/328.1 |
| 6,270,712 B1 | 8/2001 | Shoji et al. | ............ | 264/272.17 |
| 6,565,346 B1 * | 5/2003 | Kanematsu et al. | ....... | 425/130 |

FOREIGN PATENT DOCUMENTS

| | | |
|---|---|---|
| JP | 63186892 | 8/1988 |
| JP | 10119095 | 5/1998 |

\* cited by examiner

*Primary Examiner*—Duane Smith
*Assistant Examiner*—Emmanuel S. Luk
(74) *Attorney, Agent, or Firm*—Cooper & Dunham

(57) ABSTRACT

A forming metal mold for molding synthetic resin includes a base mold (4), a first forming mold (5) secured to the base mold (4) and having a molding recess (9), and a second forming mold (6) secured to the base mold (4) as it is combined with the first forming mold (5). The first forming mold (5) includes a transfer surface (9a) within the molding recess (9) in continuation to its opening edge for providing decoration to a molded product (17) on transcription to the surface of the molded product (17). The second forming mold (6) includes a charged opening (11) defining a cavity (14) along with the molding recess (9) and into which is charged a molding material. In this forming metal mold, the molding material is charged into the cavity (14) to transfer a pattern formed on the transfer surface (9a) to the molded article.

12 Claims, 19 Drawing Sheets

US 7,052,264 B2

MOLDING METAL MOLD, METHOD OF PRODUCING MOLDING METAL MOLD, AND ARTICLES MOLDED BY MOLDING METAL MOLD

TECHNICAL FIELD

This invention relates to a metal mold for forming, a method for the preparation of the metal mold for forming and a molded article obtained on forming by the metal mold for forming. More particularly, it relates to a metallic forming mold for forming, having a transfer surface for applying decorative processing to a molded article on transcription to the surface of the molded article, a method for the preparation of the metal mold for forming, and a molded article prepared using this metallic forming mold for forming.

BACKGROUND ART

Among the molded products, prepared on injecting a molding material, such as molten resin, charged into a cavity of a forming metal mold, and subsequently on allowing the so charged molten resin to be cooled and solidified, there are those the surfaces of which are decoratively worked for affording the feeling of the high grade product so that the finished articles appear as if they are formed of a metallic material. Examples of the decorative machining include mirror surface finishing, which works the product surface to a smooth and lustrous finish, a so-called spin mark machining, which forms a large number of fine parallel concentric lines on the product surface, and a so-called hairline machining, which forms a large number of fine parallel straight lines on the product surface.

The molded products with decorative surface machining are mostly formed using a metal mold provided with a transfer surface prepared by electroplating. The conventional manufacturing method for a forming metal mold, used for producing a molded article with such decorative machining, is shown in FIGS. 1 to 4.

In a conventional manufacturing method, a master 101 is first prepared, as shown in FIG. 1. This master 1 is formed of a metal material, such as brass or beryllium copper, and has a diamond cut surface 102 formed on a rim portion of its upper surface by diamond cutting. The upper surface of the master 101 is formed with a plural number of fine concentric scores for forming spin marks on the molded product to provide a spin forming surface 103.

A plating layer 104 then is formed by electroplating on the entire surface of the master 101, as shown in FIG. 2. The plating layer 104 is formed of, for example, chromium, to a thickness of 5 to 6 mm.

The master 101 and the plating layer 104 then are separated from each other to form a recess for filling 105 on the plating layer 104, as shown in FIG. 3. By separating the master 101 and the plating layer 104 from each other, the diamond cut surface 102 and the spin forming surface 103 are transcribed on corresponding surfaces of the plating layer defining the recess for filling 105. The surface to which the diamond cut surface 102 has been transcribed is formed as a mirror surface processing surface 106 for transcription to the surface of a molded article for providing mirror surface finishing to the molded article, whilst the surface to which the spin forming surface 103 has been transcribed is formed as a spin processing surface 107 for transcription to the surface of the molded product to produce spin marks thereon.

The plating layer 104 is inserted into and fixed in an insertion recess 109 of a base mold of the forming mold 108, as shown in FIG. 4. The base mold 108, with the plating layer 104 secured thereto, is set and assembled with a fixed forming mold, not shown, to produce a metallic forming mold. A molding material is charged into the recess for filling 105. When the molding material is cooled and cured, the metal mold is opened to take out the molded product from the recess for filling 105.

On the molded article, thus prepared, there are transcribed the mirror surface processing surface 106 and the spin processing surface 107, such that the molded article appears as if it is molded of a metal material.

With the conventional method, described above, the master 101 is prepared of a metal material, such as brass or beryllium copper, and the plating layer 104 is formed on its surface by electroplating, in order to apply decorative processing to the surface of a molded article.

Usually, the plating layer 104 can be formed to a preset thickness by electroplating only after a processing time interval as long as approximately two months, thus raising an inconvenience of considerably protracted manufacturing time.

Apart from the problem of the protracted manufacturing time, the plating layer 104 needs to be formed in addition to the master 101, thus raising another inconvenience of increased production cost.

DISCLOSURE OF THE INVENTION

It is therefore an object of the present invention to provide a metallic forming mold, a method for the preparation of the metallic forming mold and a molded article obtained on forming by the metallic forming mold, which are novel and which are free from the above-mentioned inconveniences of the prior art techniques It is another object of the present invention to provide a metallic forming mold, method for the preparation of the metallic forming mold and a molded article obtained on forming by the metallic forming mold, with which it is possible to shorten the manufacturing time length of the metallic forming mold and the molded article and to reduce the manufacturing cost.

In one aspect, the present invention provides a forming metal mold including a base mold, a first forming mold having a molding recess, a second forming mold secured to the base mold along with the first forming mold and having a charged opening communicating with the molding recess, a transfer surface section formed on an opening edge surface of the molding recess of the first forming mold for transcribing decoration onto a surface of a molded article, and a charged opening formed in the second forming mold. The charged opening forms a cavity, in which a molding material is to be introduced, along with the molding recess.

In another aspect, the present invention provides a forming metal mold including a base mold, a first forming mold having a molding recess, a second forming mold secured to the base mold along with the first forming mold and having a charged opening communicating with the molding recess, a first transfer surface section formed on one end of the molding recess of the first forming mold for transcribing decoration onto a surface of a molded article, and a third forming mold arranged between the base mold and the first forming mold and inserted from the opposite end of the molding recess. The third forming mold is secured to the base mold along with the first and second forming molds and having a second transfer surface section in continuation to the transfer surface section. A transfer surface for applying decorative processing on the molded article on transcription to its surface is formed within the molding recess in continuation to the opening edge of the molding recess. The first and second forming molds are combined together so that the molding recess continues to the charged opening of the second forming mold and the first and second formed molds thus combined together are secured to the base mold.

In another aspect, the present invention provides a method for manufacturing a forming metal mold including forming a first transfer surface section on one end of the molding recess of a first forming mold for transcribing the decoration to the surface of a molded article, introducing a second forming mold from the opposite end of the molding recess of the first forming mold, securing the first and second forming molds such that the first and second forming molds are clamped in position between a third forming mold having a charged opening and a base mold.

In another aspect, the present invention provides a method for manufacturing a forming metal mold including forming a first transfer surface section on one end of the molding recess of a first forming mold for transcribing the decoration to the surface of a molded article, introducing a second forming mold from the opposite end of the molding recess of the first forming mold, securing the first and second forming molds such that the first and second forming molds are clamped in position between a third forming mold having a charged opening and a base mold so that a second transfer surface section formed in the second forming mold continues to the first transfer surface section and so that the charged opening continues to the first transfer surface section. The charged opening and the first and second transfer surface sections together delimit a cavity.

The forming metal mold and the manufacturing method therefor according to the present invention are not in need of a process of forming a plating layer on the master surface.

In another aspect, the present invention provides a molded article obtained on forming by a forming metal mold on cooling and solidifying a molding material charged into a cavity defined by a molding recess of a first forming mold having a transfer surface and by a charged opening of the second forming mold. The molded article includes a transfer section obtained on transcription of the transfer surface of the first forming mold.

In another aspect, the present invention provides a molded article obtained on forming by a forming metal mold on cooling and solidifying a molding material charged into a cavity defined by a charging portion of a molding recess of a first forming mold having a transfer surface and by a charged opening of the second forming mold. The molded article includes a transfer section obtained on transcription of the transfer surface of the first forming mold in an insertion positioning section of which is introduced and placed a third forming mold.

The molded article, obtained using a forming metal mold according to the present invention, may be prepared with high transfer performance using a forming metal mold prepared without requiring electro-plating.

Other objects, features and advantages of the present invention will become more apparent from reading the embodiments of the present invention as shown in the drawings.

BEST MODE FOR CARRYING OUT THE INVENTION

Figure 1:
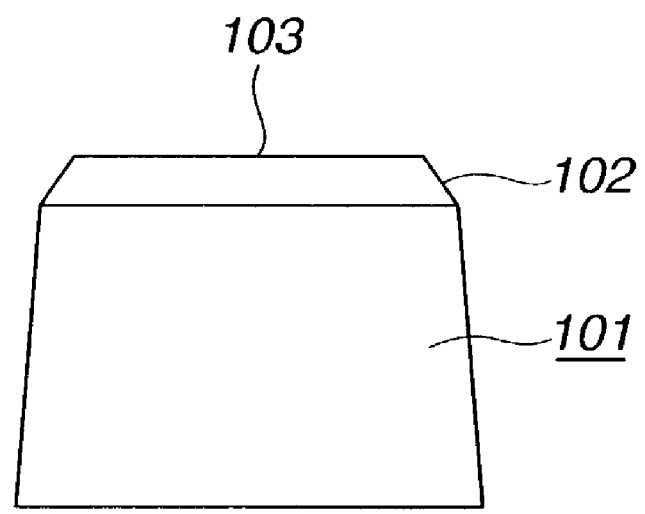
FIGS. 1 to 4 show a manufacturing process for a conventional metallic forming mold, FIG. 1 being a side view showing a master prepared, FIG. 2 being a side view showing a plated layer formed on the master surface, shown partially in cross-section, FIG. 3 being a side view showing the plating layer separated from the master, shown partially in cross-section, and FIG. 4 being a cross-sectional view showing the plating layer secured to the base mold.
Figure 2:
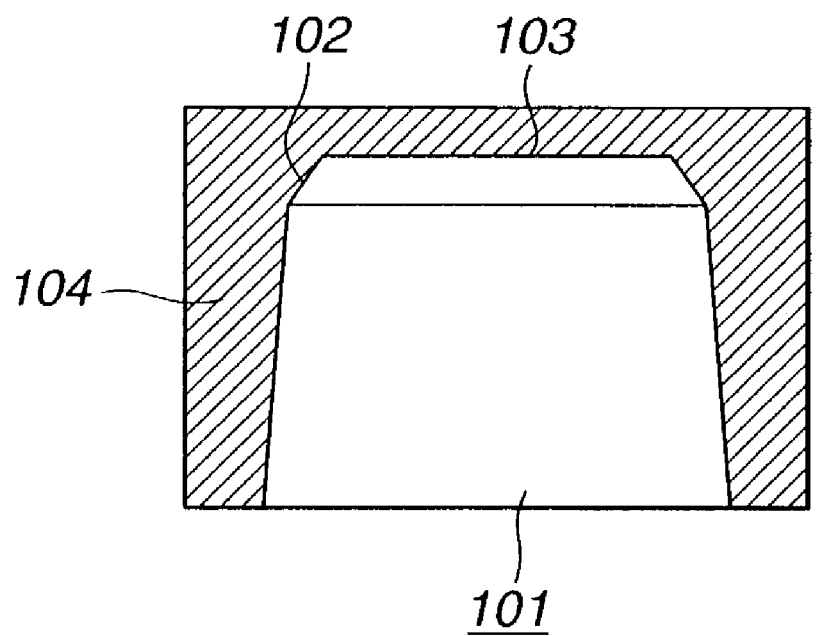
Figure 3:
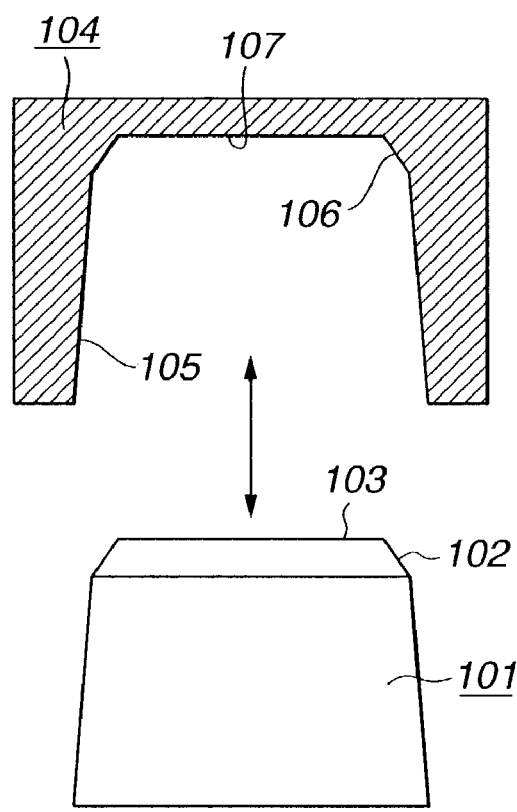
Figure 4:
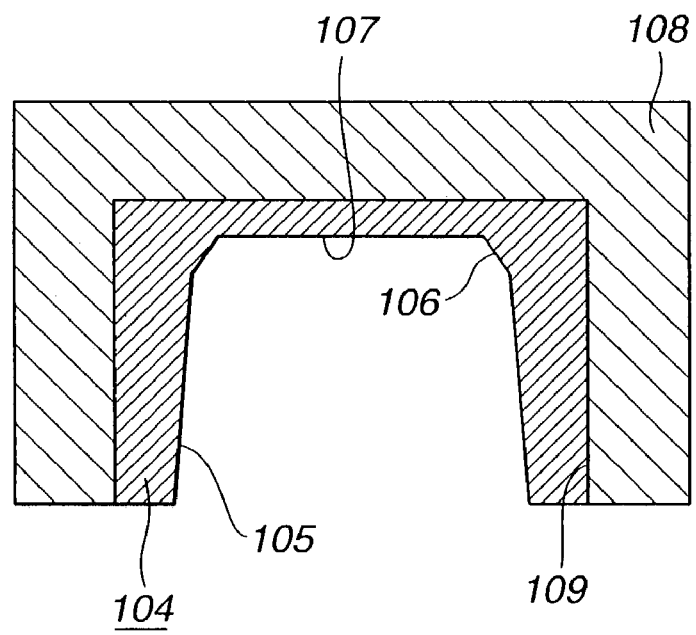

Referring to the drawings, preferred embodiments of the present invention will be explained in detail. In these embodiments, the present invention is applied to the molding of a rotary knob which is provided as a molded product in variegated electronic equipment.

Referring to FIGS. 5 to 13, a first embodiment of the present invention is hereinafter explained.

A forming metal mold 1, according to the present invention, is made up of a movable mold 2 and a fixed mold 3, of which the movable mold 2 includes a base mold 4, a first forming mold 5 and a second forming mold 6, as shown in FIGS. 5 to 8.

Figure 5:
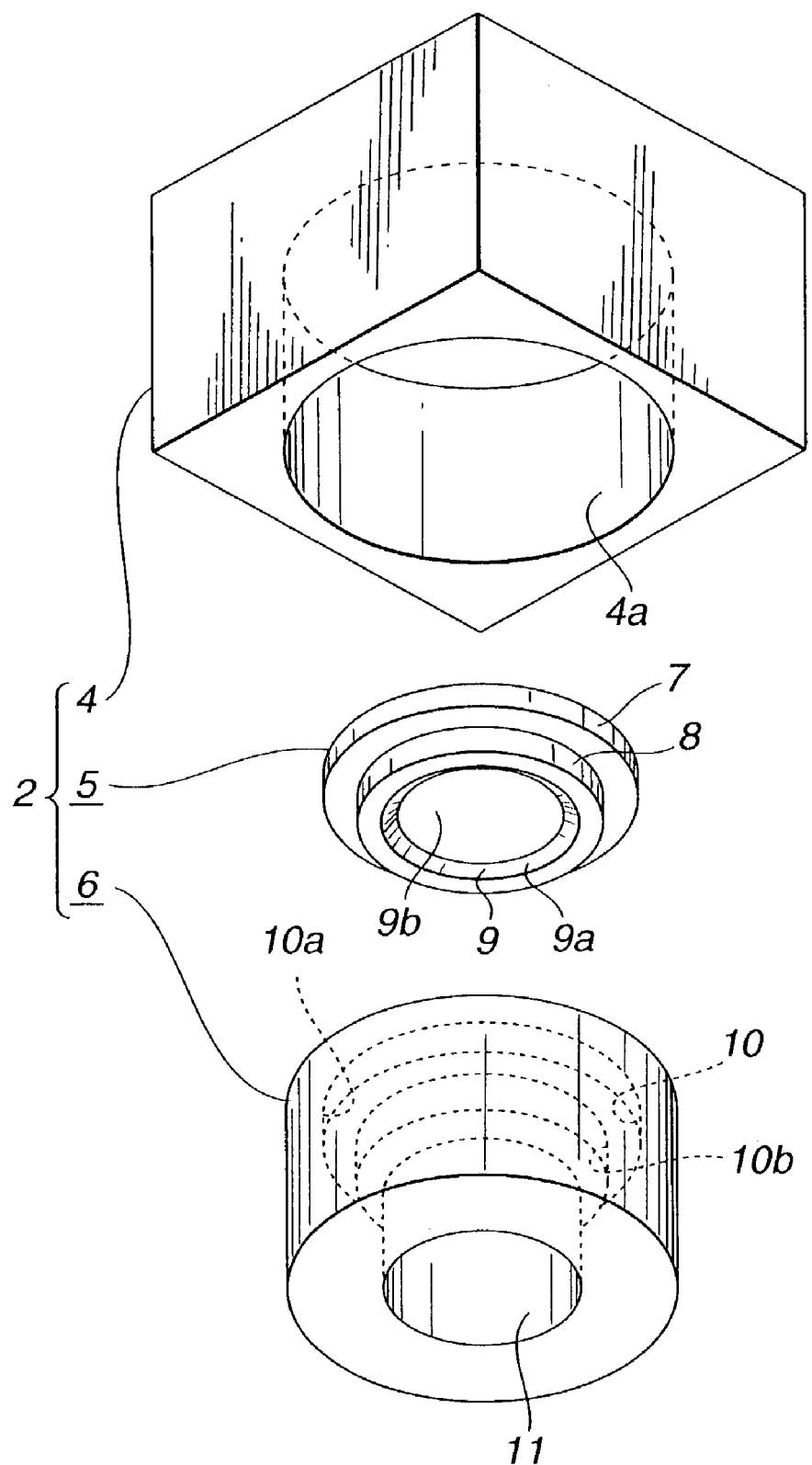
FIG. 5 is an exploded perspective view showing a movable mold constituting a metallic forming mold according to the present invention.
Figure 6:
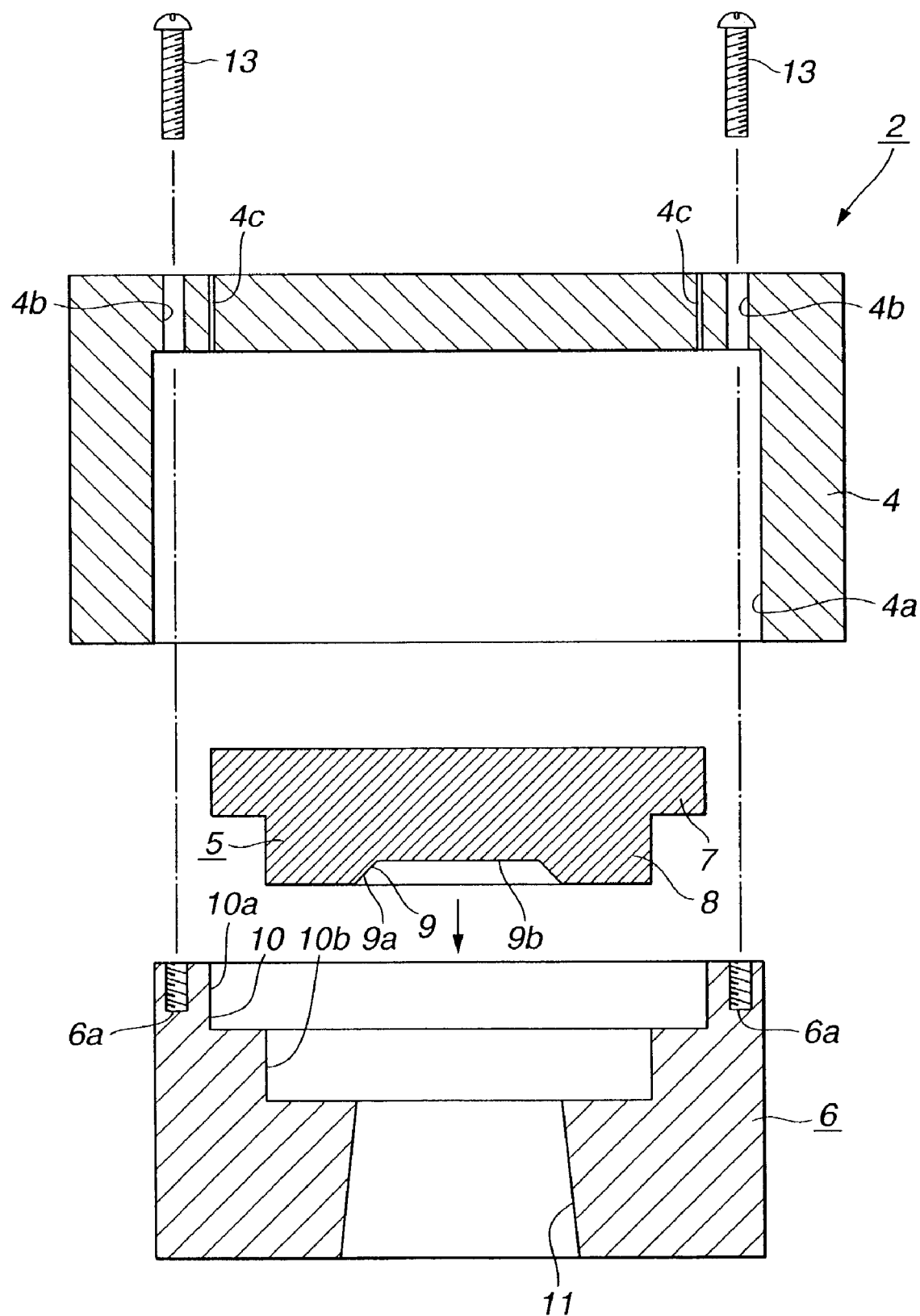
FIG. 6 is a cross-sectional view thereof.

The base mold 4 is formed as a block, which is formed with a downwardly opening positioning recess 4a having a circular transverse cross-section, as shown in FIGS. 5 and 6.

Figure 7:
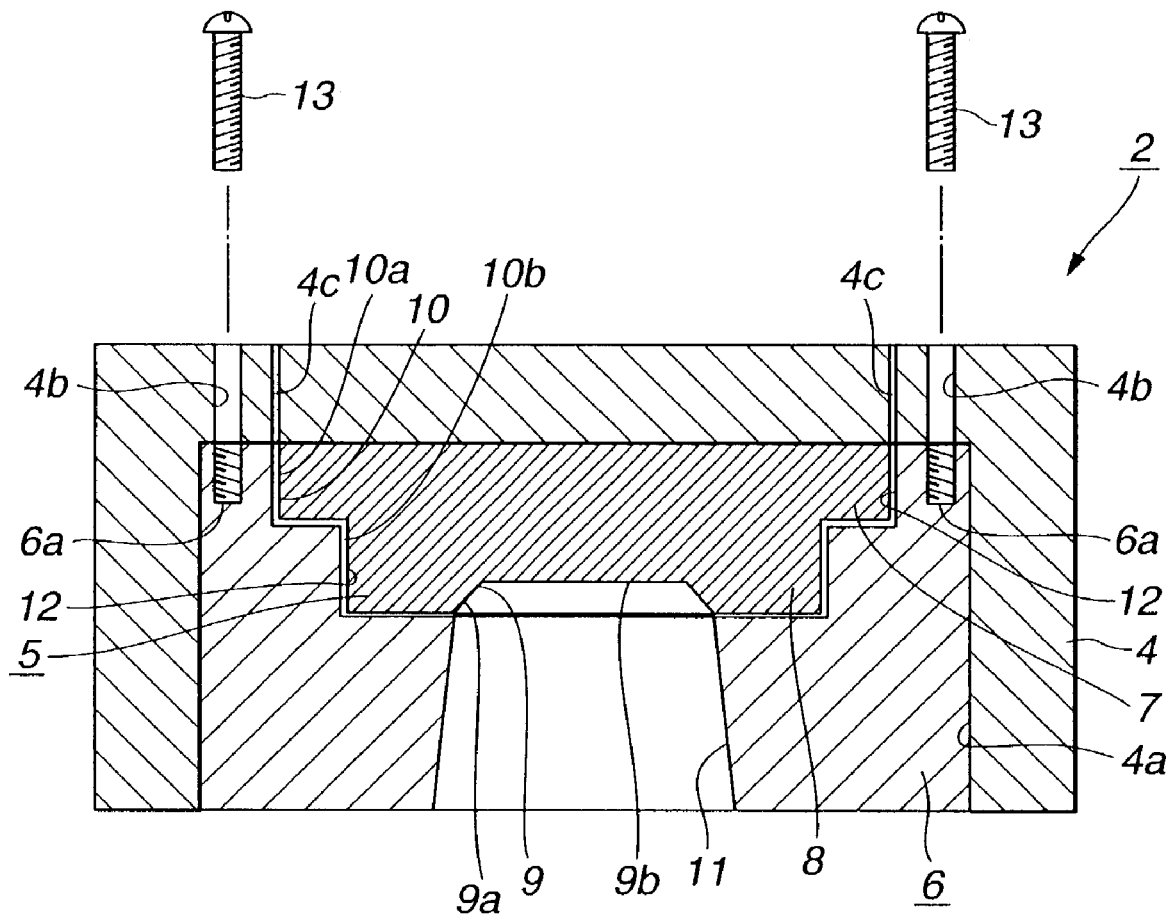
FIG. 7 is a cross-sectional view showing the movable mold.

A plurality of circumferentially spaced apart tapped holes 4b are formed in the upper surface of the base mold 4 for communicating with the positioning recess 4a. Radially inwardly of the tapped holes 4b in the base mold 4, there are formed a plurality of circumferentially spaced apart degassing holes 4c for communicating with the positioning recess 4a, as shown in FIGS. 6 and 7.

The first forming mold 5 is formed of a metallic material, for example, brass, beryllium copper or aluminum alloys, and is formed by a large diameter disc-shaped portion 7 and a substantially disc-shaped small diameter portion 8 positioned below the large diameter disc-shaped portion 7, as shown in FIGS. 5 and 6. The outer diameter of the large diameter disc-shaped portion 7 is selected to be smaller than the inner diameter of the positioning recess 4a of the base mold 4. The small diameter portion 8 is formed with a downwardly opening molding recess 9 presenting a circular opening surface. Of the surfaces defining the molding recess 9, the circumferentially extending surface continuing to the opening edge is formed as a downwardly flared transfer surface 9a. A downwardly directed circular inner bottom surface 9b is formed in continuation to the transfer surface 9a.

Figure 8:
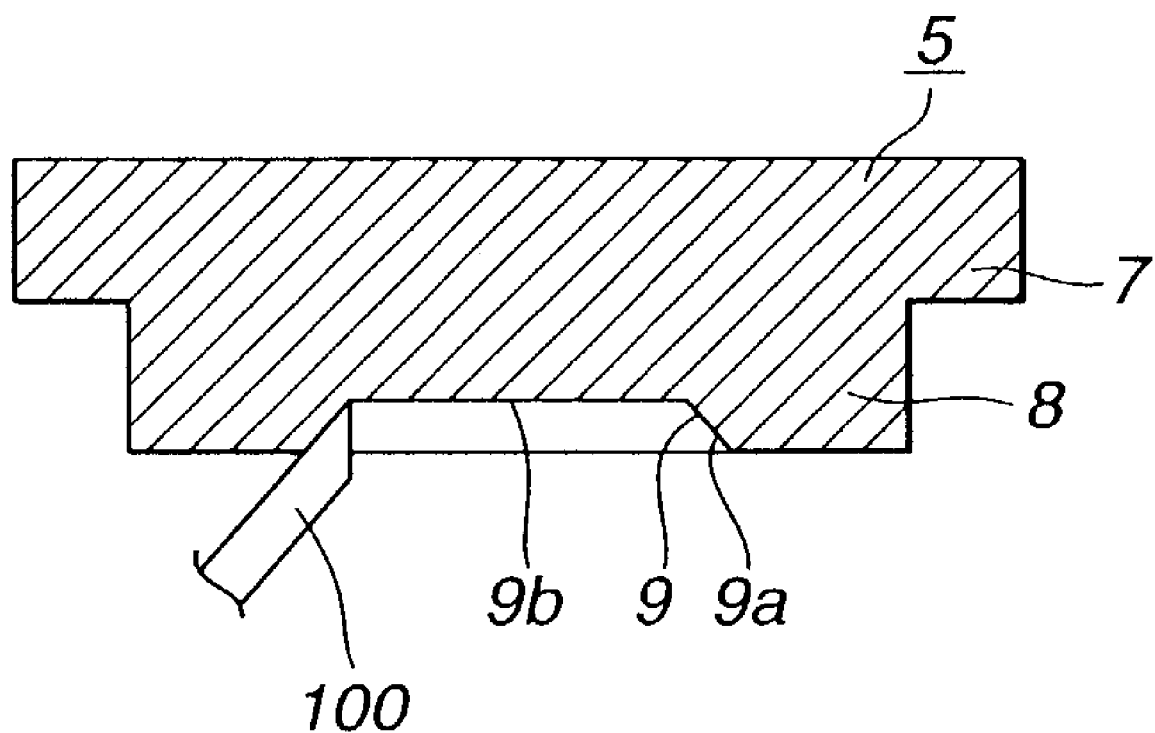
FIG. 8 is a cross-sectional view showing the state of mirror surface machining for forming a transfer surface of a first forming mold.

The transfer surface 9a is machined to a mirror surface to have a smooth and lustrous surface, by a device including, for example, a cutter 100 formed with e.g., diamond, as shown in FIG. 8. In the forming metal mold 1, since the transfer surface 9a is formed in continuation to the opening edge of the molding recess 9, the cutter 100 may readily be inserted into the molding recess 9 to enable the mirror-surface-finishing operation to be carried out readily and satisfactorily.

The inner bottom surface 9b is formed as a smooth surface, however, if it is desired to form so-called spin marks, comprised of a large number of fine concentric hairlines, on the surface of a molded article, it is also possible to form fine concentric scores in the inner bottom surface 9b by e.g., a suitable machining tool, to transfer these fine scores to the molded article.

The second forming mold 6 is formed of, for example, a metallic material, such as iron, as a cylinder, having an upwardly opened inserting recess 10 and a downwardly opening charged opening 11 communicating with the insertion recess 10, as shown in FIG. 5. The height and the outer diameter of the second forming mold 6 are selected to be approximately equal to the depth and the inner diameter of the positioning recess 4a of the base mold 4, respectively, as shown in FIG. 7.

The insertion recess 10 is made up of a large diameter portion 10a and a small diameter portion 10b lying below the portion 10a, with the height and the inner diameter of the large diameter portion 10a being approximately equal to the height and the outer diameter of the large diameter circular portion 7 of the first forming mold 5, respectively, and with the height and the inner diameter of the small diameter portion 10b being approximately equal to the height and the outer diameter of the small diameter portion 8 of the first forming mold 5, respectively, as shown in FIG. 6. The charged opening 11 has its upper opening edge surface approximately equal in size to the upper opening edge surface of the molding recess 9 of the first forming mold 5, with the size of the inner diameter of the charged opening 11 increasing slightly downwardly, as shown in FIG. 7.

In the upper end of the second forming mold 6, there are formed a plurality of circumferentially spaced apart tapped holes 6a in register with the plural tapped holes 4b formed in the base mold 4.

Figure 9:
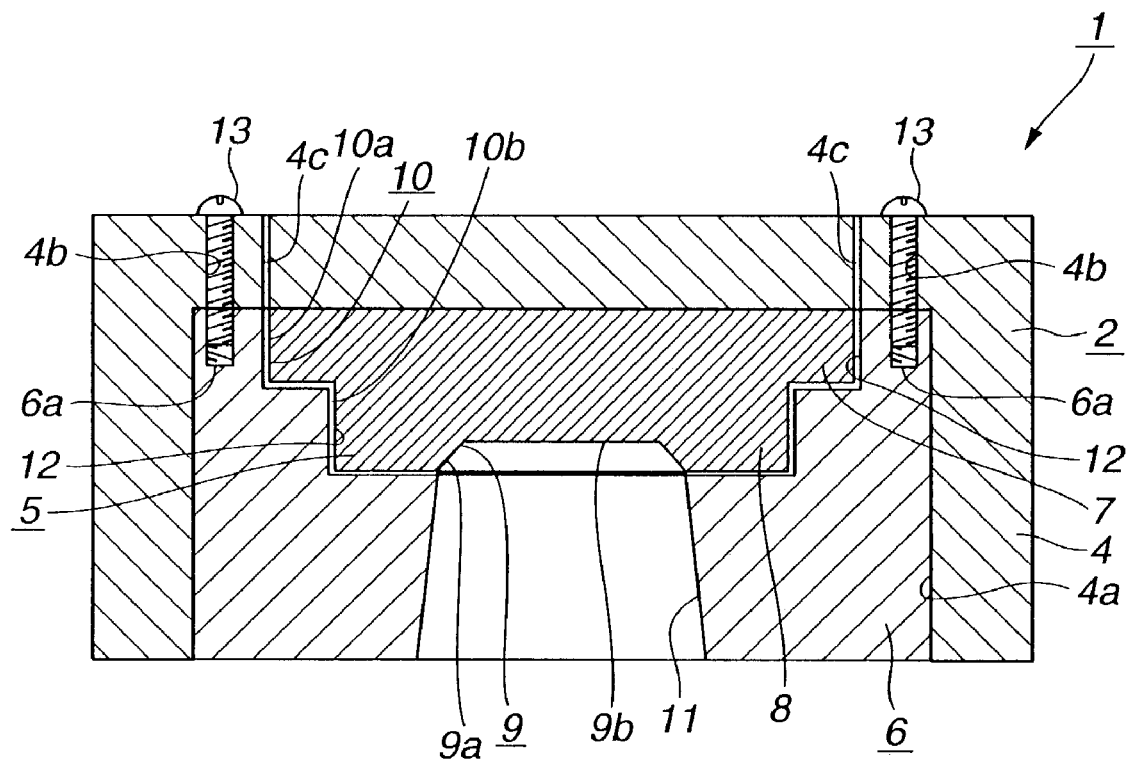
FIG. 9 is a cross-sectional view showing the state of the metal mold for forming according to the present invention.
Figure 9:
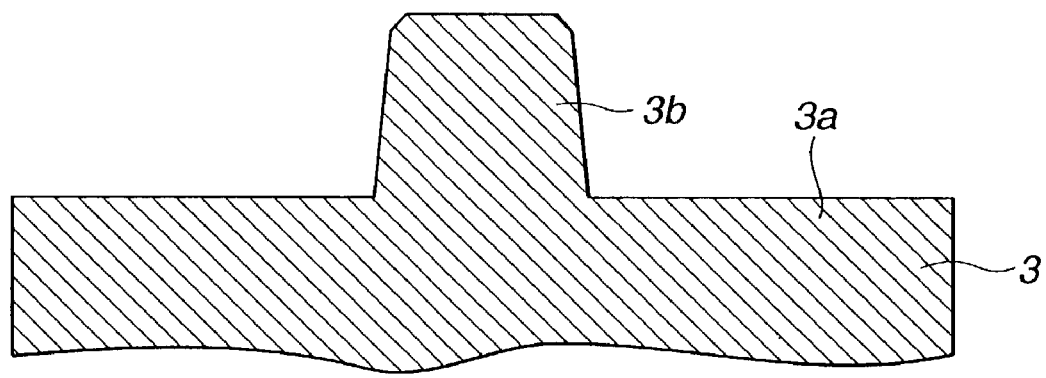

The fixed mold 3 is arranged below the movable mold 2, with the movable mold 2 being movable in the up-and-down direction with respect to the fixed mold 3, as shown in FIG. 9. The fixed mold 3 is made up of a bulk portion 3a and a core portion 3b projected upwardly from the bulk portion 3a.

Referring to FIGS. 6 and 7, the manufacturing method for the forming metal mold 1 according to the present invention is explained in detail.

First, the fixed mold 3, base mold 4, first forming mold 5 and the second forming mold 6 are separately prepared. These component portions, that is the fixed mold 3, base mold 4, first forming mold 5 and the second forming mold 6, are produced by machining respective preset blanks of the metallic materials using e.g., an NC (numerically controlled) machine tools.

The first forming mold 5 is manufactured by mirror surface machining its surface, which later proves the transfer surface 9a, to a smooth lustrous finish, using the cutter 100, formed e.g., of diamond, as shown in FIG. 8. If desired to form spin marks in the inner bottom surface 9b, a number of fine concentric scores are formed therein, using a suitable machine tool.

The first forming mold 5 is inserted into the insertion recess 10 of the second forming mold 6, to combine the first forming mold 5 and the second forming mold 6 together, as shown in FIG. 7. When the first forming mold 5 and the second forming mold 6 are combined together, the opening edge surface of the molding recess 9 and the upper opening edge surface of the charged opening 11 are brought into coincidence with each other to define a continuous spacing, as shown in FIG. 7.

A plurality of recesses of minor size are formed in the contact surfaces of the first forming mold 5 and the second forming mold 6, such that, when the first forming mold 5 and the second forming mold 6 are combined together, a plurality of interstices, operating as gas vents 12, are formed therebetween, as shown in FIG. 7. This interstice is of a size on the order of 0.02 mm.

The first forming mold 5 and the second forming mold 6, thus combined together, are inserted in position in the insertion recess 10 of the base mold 4, as shown in FIG. 7. With the first forming mold 5 and the second forming mold 6 thus inserted in the insertion recess 10, the upper openings of the plural gas vents 12 are coincident with the lower openings of the plural degassing holes 4c of the base mold 4, with the plural tapped holes 6a of the second forming mold 6 coinciding with the plural tapped holes 4b of the base mold 4.

Finally, a plurality of set screws 13 are inserted into the tapped holes 4b into threaded engagement with the tapped holes 6a to form a movable mold 2 in which the first forming mold 5 and the second forming mold 6 are secured to the base mold 4. The movable mold 2 and the fixed mold 3 are arranged in position to form the forming metal mold 1.

Referring to FIGS. 9 to 12, the process of molding a rotary knob, as a molded product of the present invention, is explained in detail.

Figure 10:
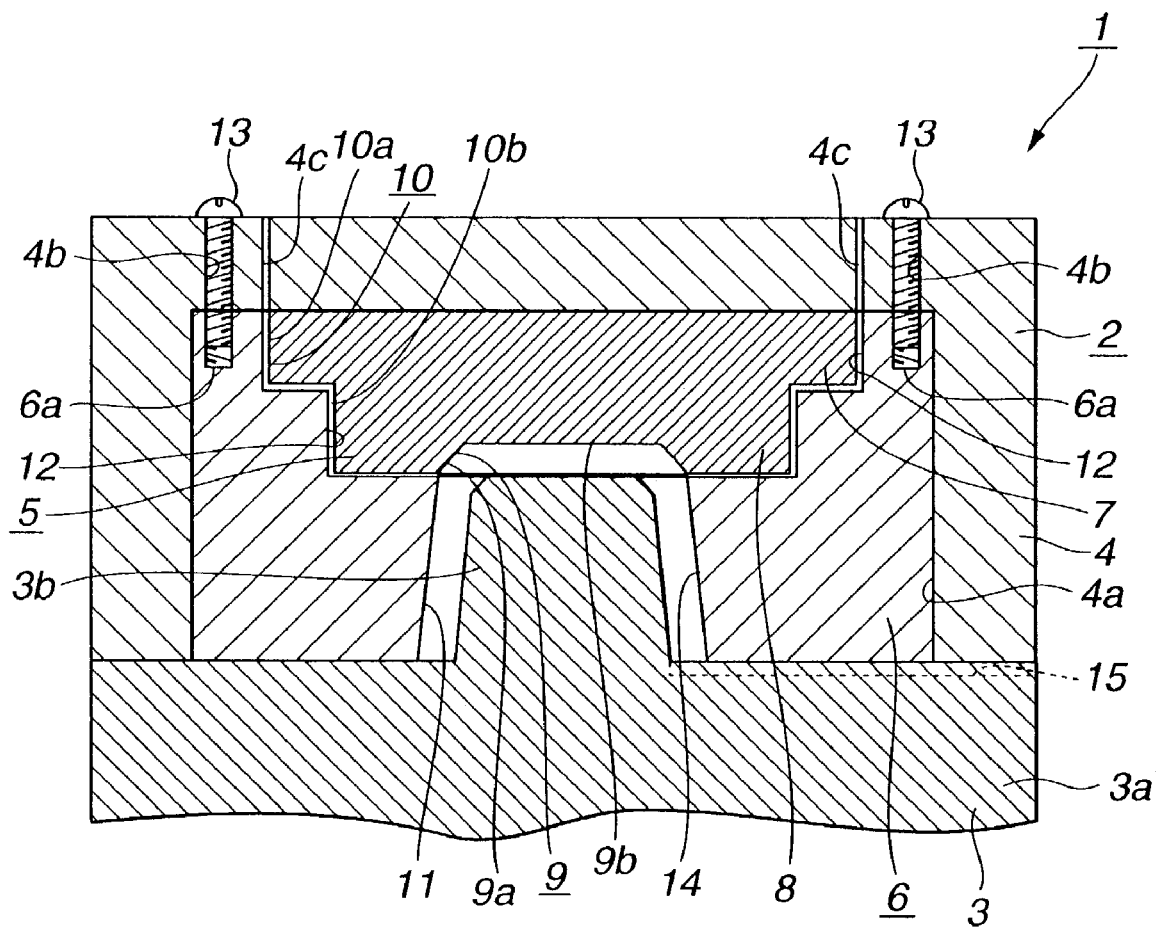
FIG. 10 is a cross-sectional view showing the state in which a cavity has been formed by the movable mold compressing against the fixed mold.

In molding the rotary knob, using the forming metal mold 1 of the present invention, the movable mold 2 is moved downwards, beginning from the mold opening state in which the movable mold 2 and the fixed mold 3 are separated from each other in the up-and-down direction, as shown in FIG. 9, until the movable mold 2 compresses against the fixed mold 3, with the core portion 3b then being intruded into the charged opening 11, as shown in FIG. 10. When the movable mold 2 compresses against the fixed mold 3, there is formed a cavity 14 into which the molding material is charged, as shown in FIG. 10. The cavity 14 is defined by a spacing delimited by respective surfaces of the first and second forming metal molds 5, 6 and the fixed mold 3.

Figure 11:
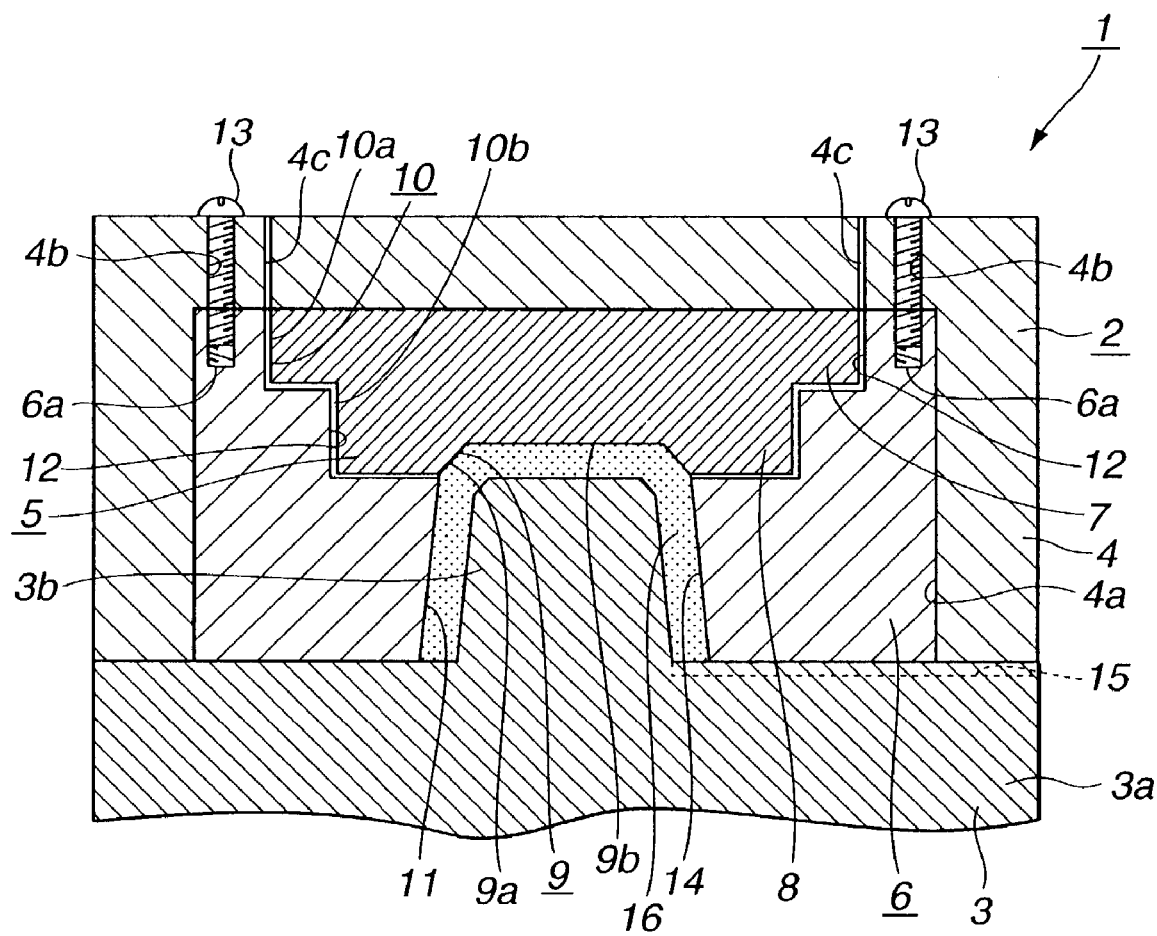
FIG. 11 is a cross-sectional view showing the state in which a molding material has been charged into the cavity.

The molding material 16 then is charged into the cavity 14 through a runner 15, as shown in FIG. 11. In charging the molding material 16, air or gases are vented to outside via plural gas vents 12 and through plural degassing holes 4c of the base mold 4. By this degassing, so-called gas burning of the first and second forming molds 5, 6 or blistering, hazing or cracking on the surface of the molded product may be prevented for occurring.

Figure 12:
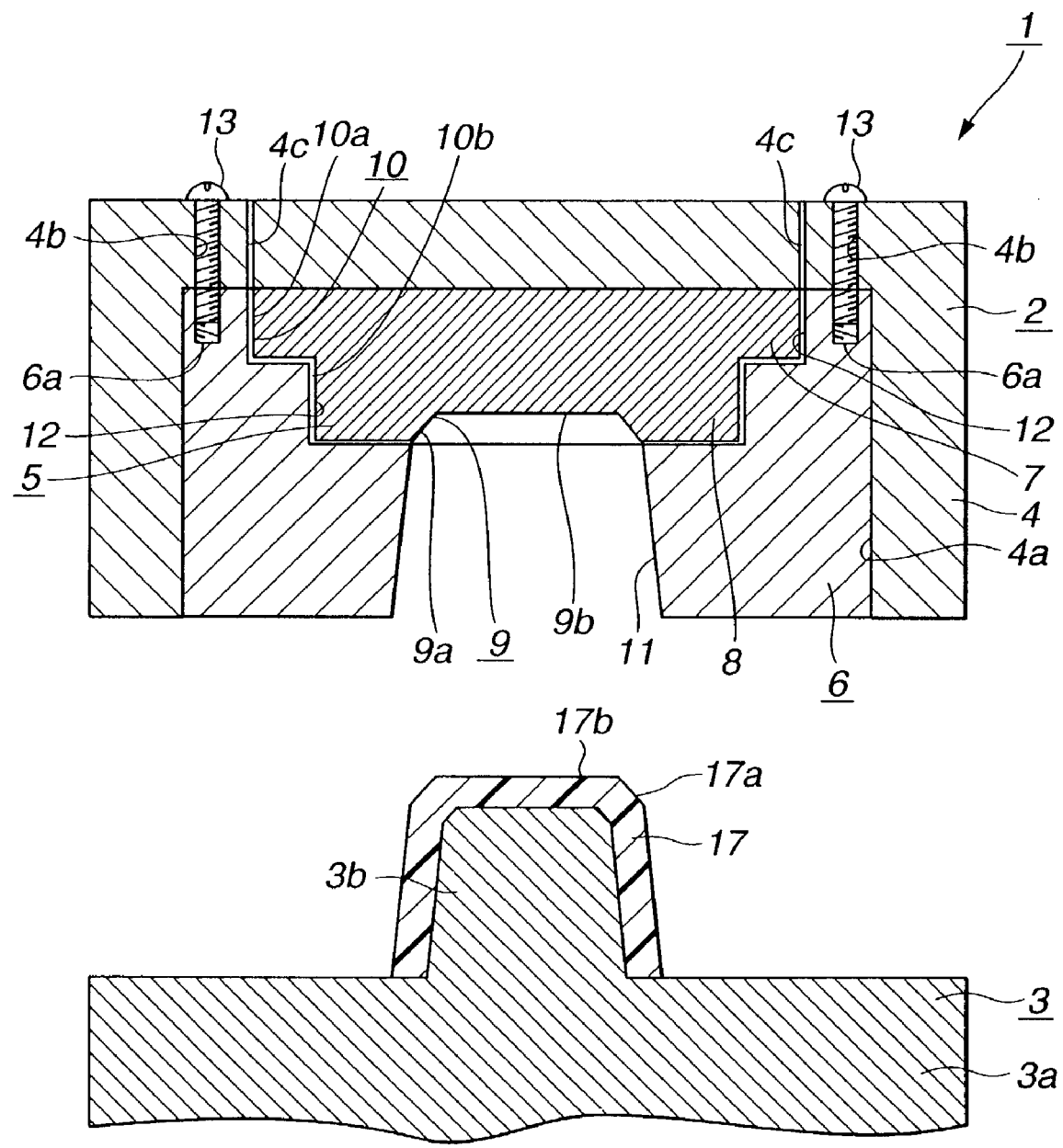
FIG. 12 is a cross-sectional view showing the state in which the molded article has been prepared and the metal mold for forming has been opened.

When the molding material 16 is cooled and cured, a molded product 17 is finished. So, the movable mold 2 is uplifted to open the forming metal mold 1, as shown in FIG. 12. The molded product 17 is left in the core portion 3b of the fixed mold 3, as shown in FIG. 12. The molded product 17 is ejected by a knock-out pin, not shown, to dismount the molded product 17 from the fixed mold 3 to complete the entire take-out process.

Figure 13:
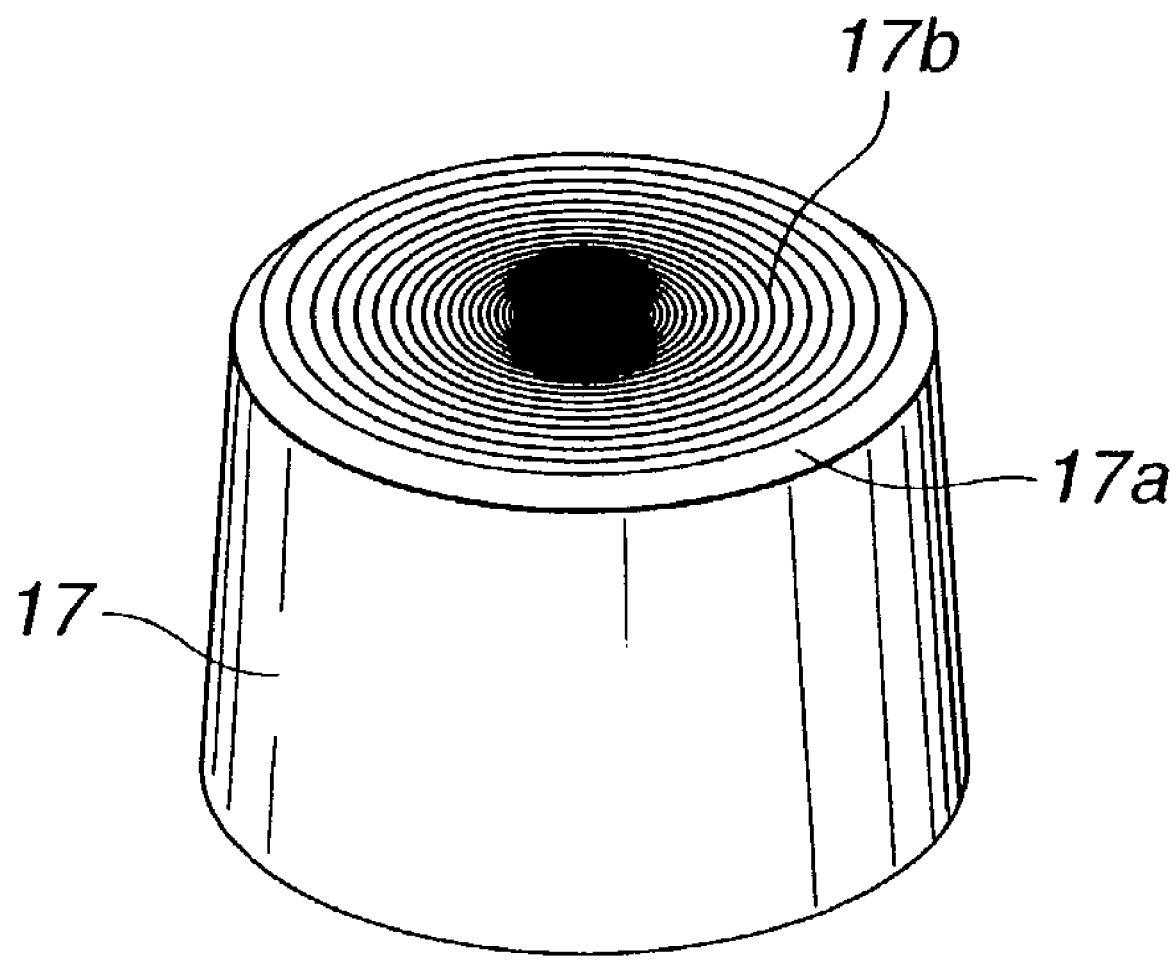
FIG. 13 is a perspective view showing a molded article prepared by the forming metal mold according to the present invention.

On the upper edge surface of the molded product 17, a transcribed portion 17a, corresponding to the transfer surface 9a of the first forming mold 5, is formed, as shown in FIG. 13. The transcribed portion 17a has a smooth and lustrous mirror surface. If inner bottom surface 9b of the first forming mold 5 is fluted, as shown in FIG. 13, to form spin marks, these spin marks are formed on the end face 17b of the molded product 17.

In this manner, the transcribed portion 17a is formed to a mirror surface, and spin marks are formed on the end face 17b of the molded product 17, so that, even although the molded product is formed of a resin material, the molded product 17 appears as if it is formed of a metallic material.

With the forming metal mold 1 according to the present invention, in which the first forming mold 5 having the transfer surface 9a is formed, without forming a plating layer by electroplating on the master surface, with the first forming mold 5 serving as a constituent element of the forming metal mold 1, it is possible to reduce both the manufacturing time and cost of the forming metal mold 1.

Referring to FIGS. 14 to 21, the second embodiment of the present invention is explained in detail.

A forming metal mold 1A, now explained, differs from the forming metal mold 1, described above, only as to the shape of the first forming mold and as to having a third forming mold. Consequently, only the portions different from the forming metal mold 1 are explained, while the other portions are depicted with reference numerals corresponding to those of the forming metal mold 1 and are not explained specifically.

Figure 14:
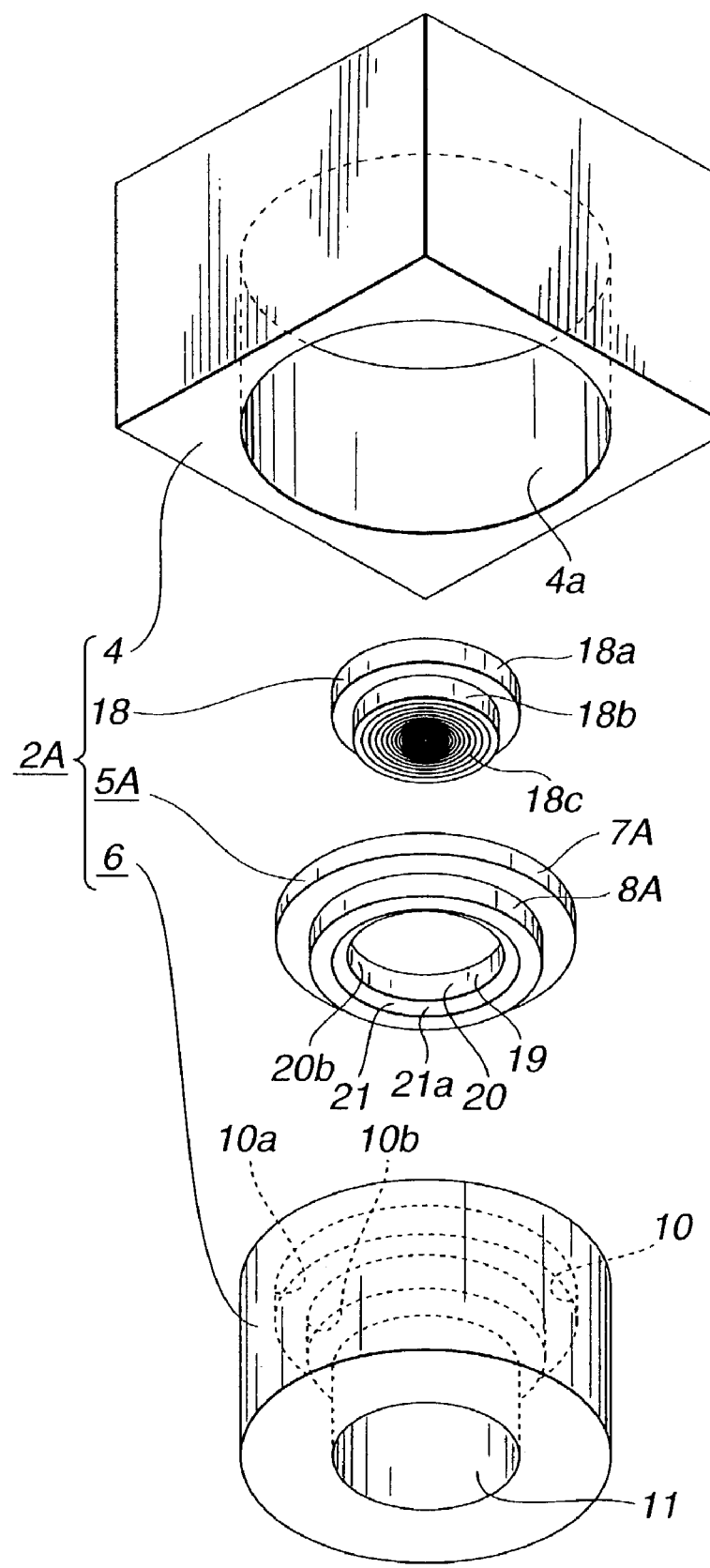
FIG. 14 is an exploded perspective view showing a movable metal mold according to another instance of a metal mold for forming according to the present invention.
Figure 15:
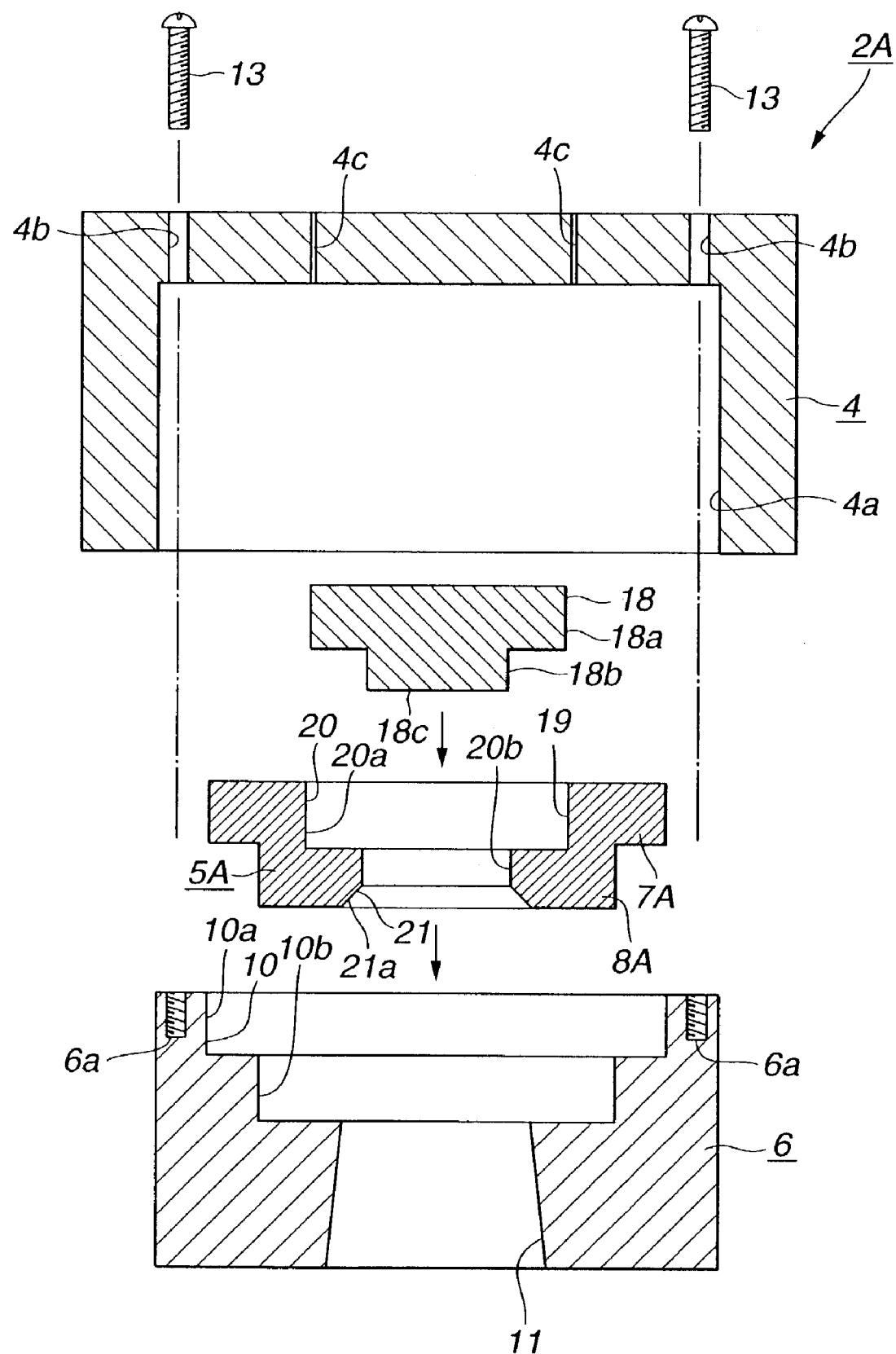
FIG. 15 is a cross-sectional view thereof.
Figure 16:
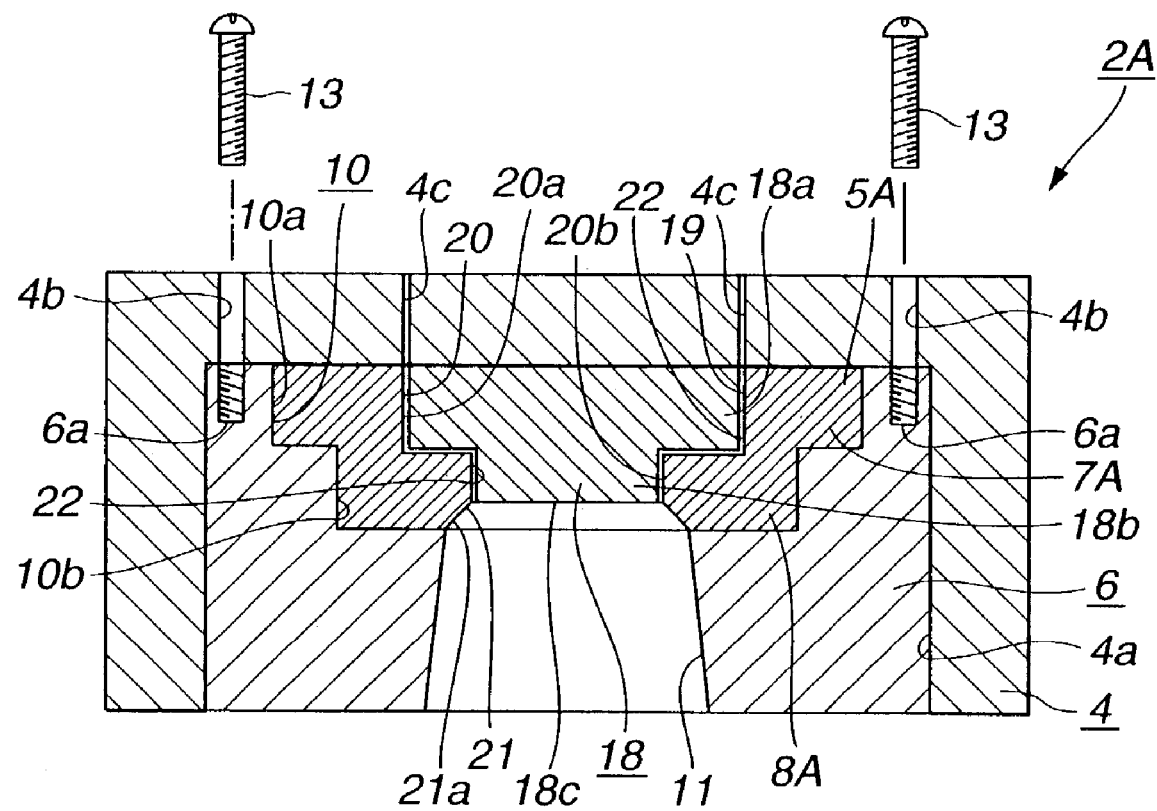
FIG. 16 is a cross-sectional view showing another instance of the movable metal mold.

Referring to FIGS. 14 to 16, the forming metal mold 1A of the present embodiment is provided with a movable mold 2A and a fixed mold 3, with the movable mold 2A having a base mold 4, a first forming mold 5A, a second forming mold 6 and a third forming mold 18.

The first forming mold 5A is formed of a metallic material, for example, brass, beryllium copper or aluminum alloys, and is integrally formed by a flat toroidally-shaped large diameter portion 7A and a substantially toroidally-shaped small diameter portion 8A, provided below the large diameter portion 7A. The large diameter portion 7A has a molding opening 19 at its center, with the molding opening 19 having an upper insertion positioning portion 20 and a lower charging portion 21. The insertion positioning portion 20 is made up of an upper side portion 20a, formed in the large diameter portion 7A, and a lower side portion 20b, formed in the small diameter portion 8A excluding its lower portion, with the inner diameter of the upper side portion 20a being larger than the inner diameter of the lower side portion 20b The charging portion 21 is formed at a lower end of the small diameter portion 8A, and has its upperside opening coincident with a lower side opening of the insertion positioning portion 20, as shown in FIG. 16. The charging portion 21, continuing to the lower opening edge of the molding opening 19, is flared in the direction of the lower opening edge of the molding opening for defining a circumferentially extending downwardly flared transfer surface 21a.

Figure 17:
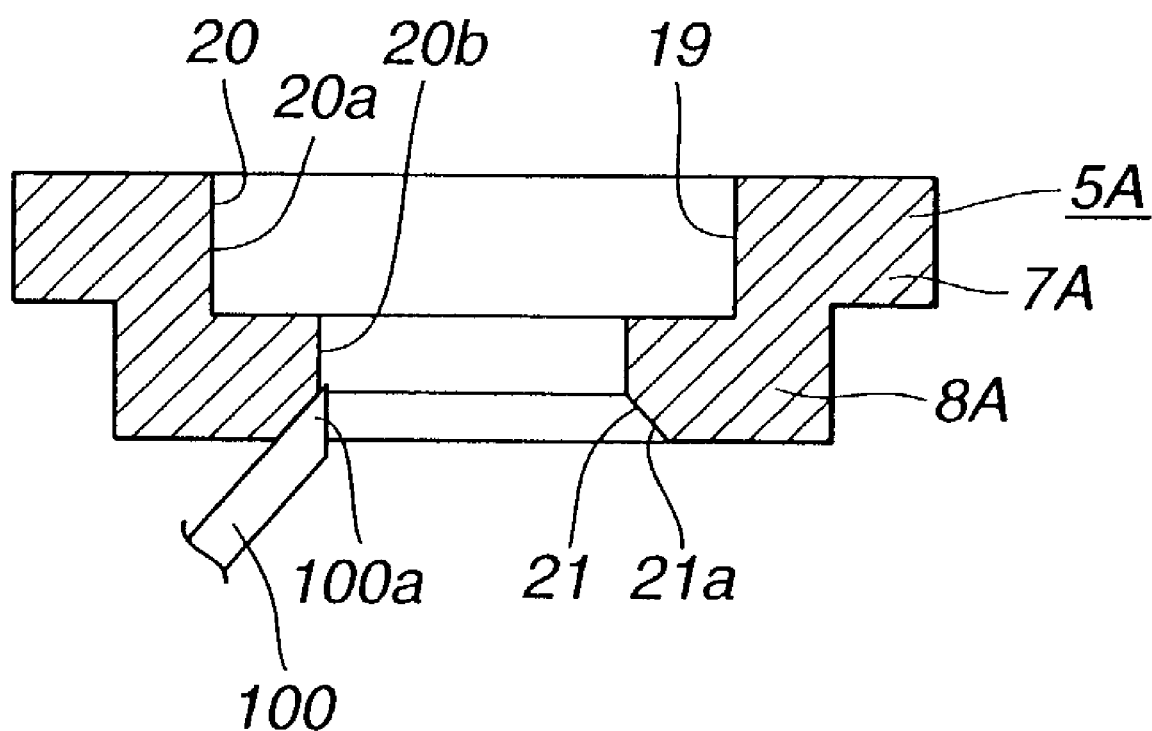
FIG. 17 is a cross-sectional view showing the state of mirror surface machining for forming a transfer surface of a first forming mold.

Similarly to the transfer surface 9a of the first forming mold 5, the transfer surface 21a is machined to a mirror surface to have a smooth lustrous surface by a unit having a cutter 100 formed by e.g., diamond, as shown in FIG. 17.

With the forming metal mold 1A of the present invention in which the transfer surface 21a is formed in continuation to the opening edge of the molding opening 19, and in which the upper side of the charging portion 21 is opened, the cutter 100 can readily be introduced into the molding opening 19. Moreover, since the machining to a mirror surface finish can be carried out as an end 100a of the cutter 100 is projected from the charging portion 21 into the inside of the insertion positioning portion 20, as shown in FIG. 17, this machining operation to a mirror surface can be carried out extremely readily and satisfactorily.

The third forming mold 18 is formed of a metallic material, such as brass, beryllium copper or aluminum alloy, and is integrally formed by a disc-shaped large diameter portion 18a and a similarly disc-shaped small diameter portion 18b, provided below the large diameter portion, as shown in FIGS. 14 and 15. The outer diameter and the height of the large diameter portion 18a are selected to be approximately equal to the inner diameter and depth of the upper side portion 20a of the insertion positioning portion 20 of the first forming mold 5A, respectively, whilst the outer diameter and the height of the small diameter portion 18b are selected to be approximately equal to the inner diameter and depth of the lower side portion 20b of the insertion positioning portion 20.

The lower surface of the third forming mold 18 is formed as a transfer surface 18c having plural fine concentric scores for forming spin marks on the surface of the molded article. These fine scores are formed by suitable machine tools. In the forming metal mold 1A, since the third forming mold 18 is provided independently, the operation by machine tools can be carried out readily to enhance the ease in the machining operations.

Referring to FIGS. 15 and 16, the manufacturing method for the forming metal mold 1A according to the present invention is explained in detail.

First, the fixed mold 3, base mold 4, first forming mold 5A, second forming mold 6 and the third forming mold 18 are separately prepared. The fixed mold 3, base mold 4, first forming mold 5A, second forming mold 6 and the third forming mold 18 are formed by machining respective metallic materials using e.g., an NC machine, not shown.

The first forming mold 5A is formed by machining to a mirror surface, using the cutter 100 of e.g., diamond, so that its surface proving the transfer surface 21a will have a smooth lustrous surface, as shown in FIG. 17. The third forming mold 18 is prepared by forming plural fine concentric scores on its surface proving the transfer surface 18c, using a suitable machine tool, not shown.

Figure 18:
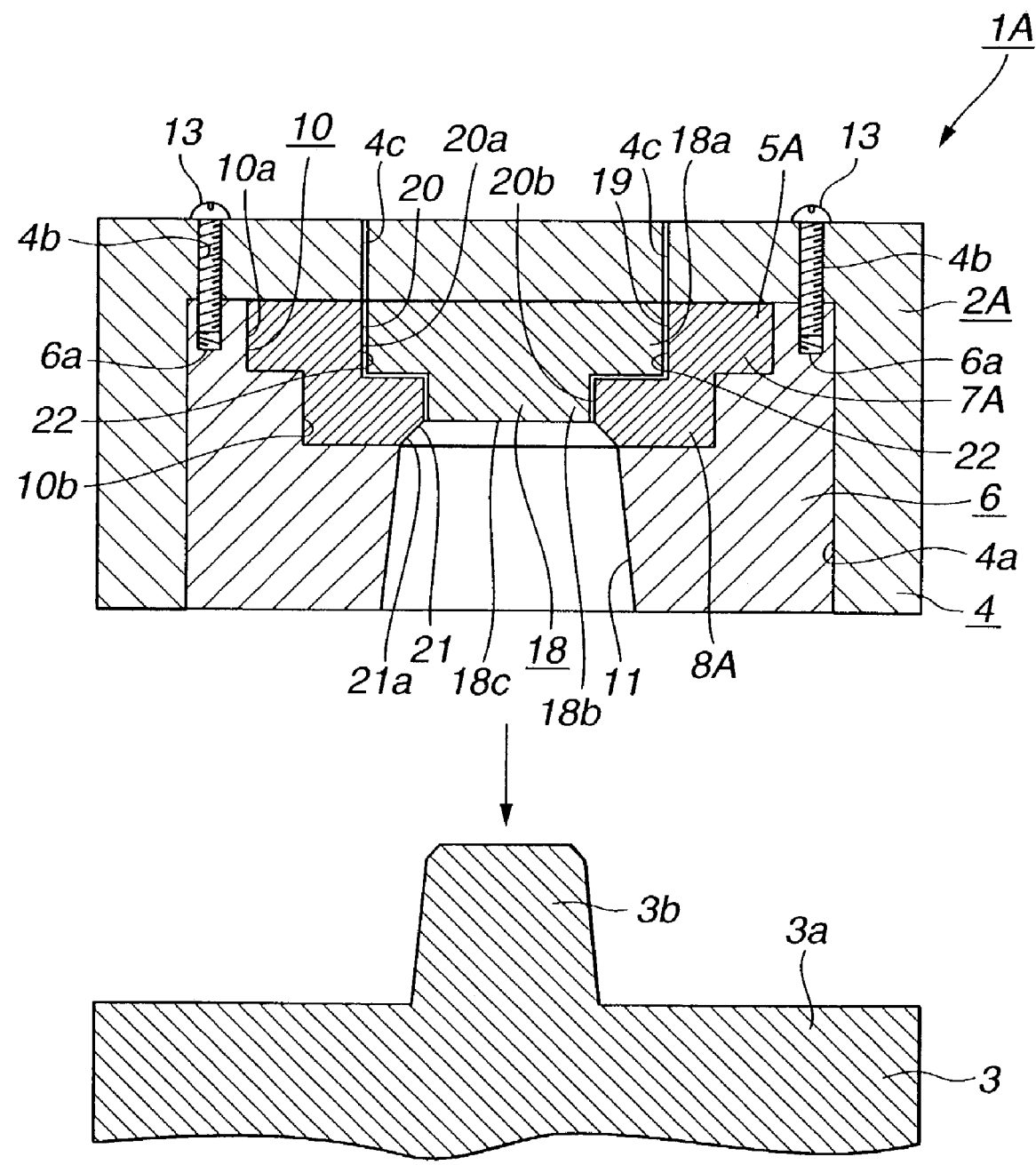
FIG. 18 is a cross-sectional view showing the opened state of the metal mold for forming according to the present invention.

The third forming mold 18 is inserted into the insertion positioning portion 20 of the first forming mold 5A and connected to the first forming mold 5A, as shown in FIG. 16. A plurality of recesses of minor size are formed in the contact surfaces of the third forming mold 18 and the first forming mold 5A, such that, when the third forming mold 18 and the first forming mold 5A are combined together, a plurality of interstices, operating as gas vents 22, are formed therebetween, as shown in FIG. 18. This interstice is of a size on the order of 0.02 mm.

In the forming metal mold 1A of the present invention, plural gas vents 22 are formed between the third forming mold 18 and the first forming mold 5A. Alternatively, these gas vents may be formed between the first forming mold 5A and the second forming mold 6, to exhaust air or gas to outside the forming metal mold 1A, as in the above-described forming metal mold 1.

The first forming mold 5A, combined with the third forming mold 18, is introduced into an insertion positioning portion 10 of the second forming mold 6. The first forming mold 5A and the second forming mold 6 are combined together, as shown in FIG. 16. When the first forming mold 5A and the second forming mold 6 are once combined together, a continuous spacing is defined, with the lower opening edge of the charging portion 21 coinciding with the upper opening edge of the charged opening 11, as shown in FIG. 18.

The first forming mold 5A and the second forming mold 6, thus combined together, are inserted into the positioning recess 4a of the base mold 4, as shown in FIG. 16. With the first forming mold 5A and the second forming mold 6 inserted in position in the positioning recess 4a, the upper side openings of the plural gas vents 22 are in register with the lower side openings of the plural degassing holes 4c of the base mold 4, whilst the plural tapped holes 6a of the second forming mold 6 are in register with the plural tapped holes 4b of the base mold 4.

Finally, the plural set screws 13 are introduced into the tapped holes 4b into threaded engagement with the tapped holes 6a, whereby the first forming mold 5A, the second forming mold 6 and the third forming mold 18 are secured to the base mold 4, to form the movable mold 2A, as shown in FIG. 18. The movable mold 2A and the fixed mold 3 are arranged in position to form the forming metal mold 1A.

Referring to FIGS. 17 to 21, the process of molding a rotary knob, as a molded product of the present invention, is explained in detail.

Figure 19:
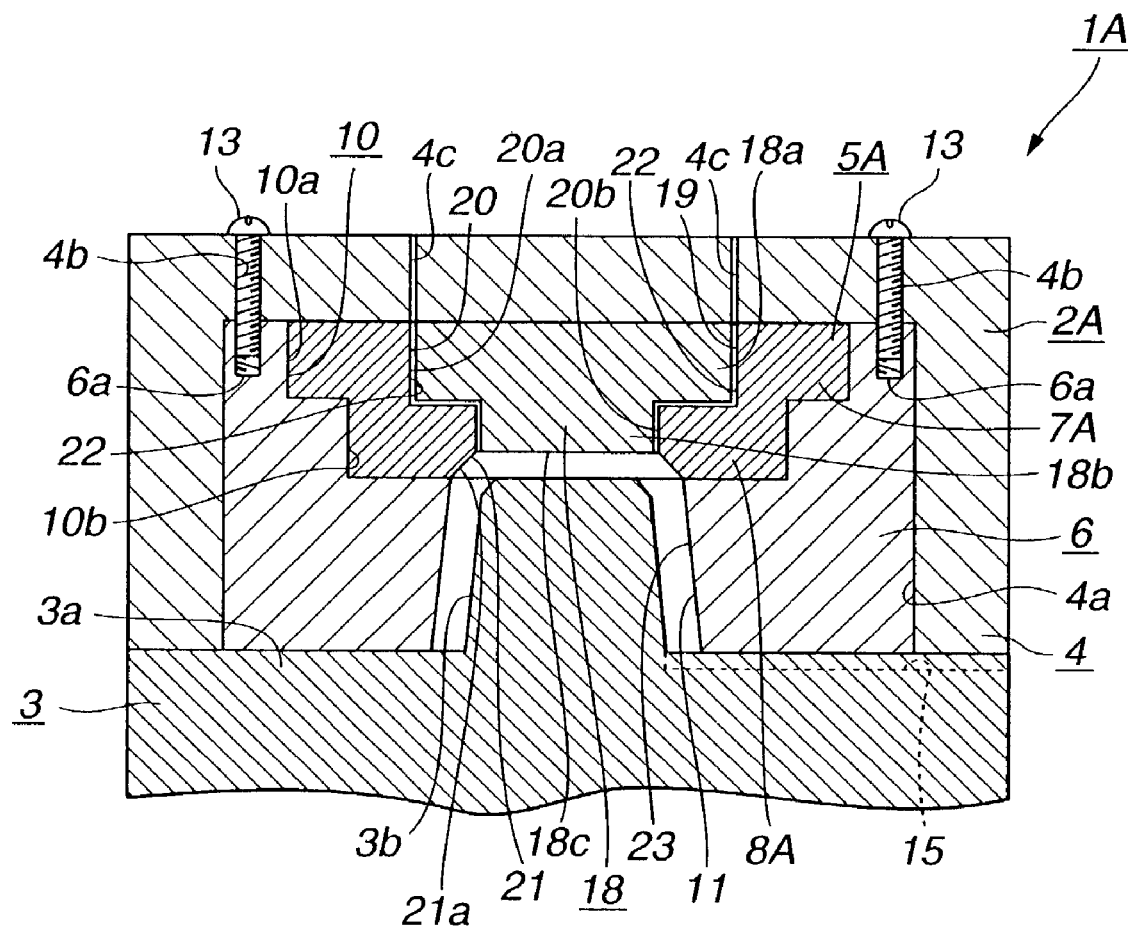
FIG. 19 is a cross-sectional view showing the state in which a cavity has been formed by the movable mold compressing against the foxed mold.

In molding the rotary knob, using the forming metal mold 1 of the present invention, the movable mold 2A is moved downwards, beginning from the mold opening state in which the movable mold 2A and the fixed mold 3 are separated from each other in the up-and-down direction, as shown in FIG. 18, until the movable mold 2A compresses against the fixed mold 3, with the core portion 3b then being intruded into the charged opening 11, as shown in FIG. 19. When the movable mold 2A compresses against the fixed mold 3, there is formed a cavity 23 into which the molding material is charged, as shown in FIG. 19. The cavity 23 is defined by a spacing delimited by respective surfaces of the first to third forming metal molds 5, 6, 18 and the fixed mold.

Figure 20:
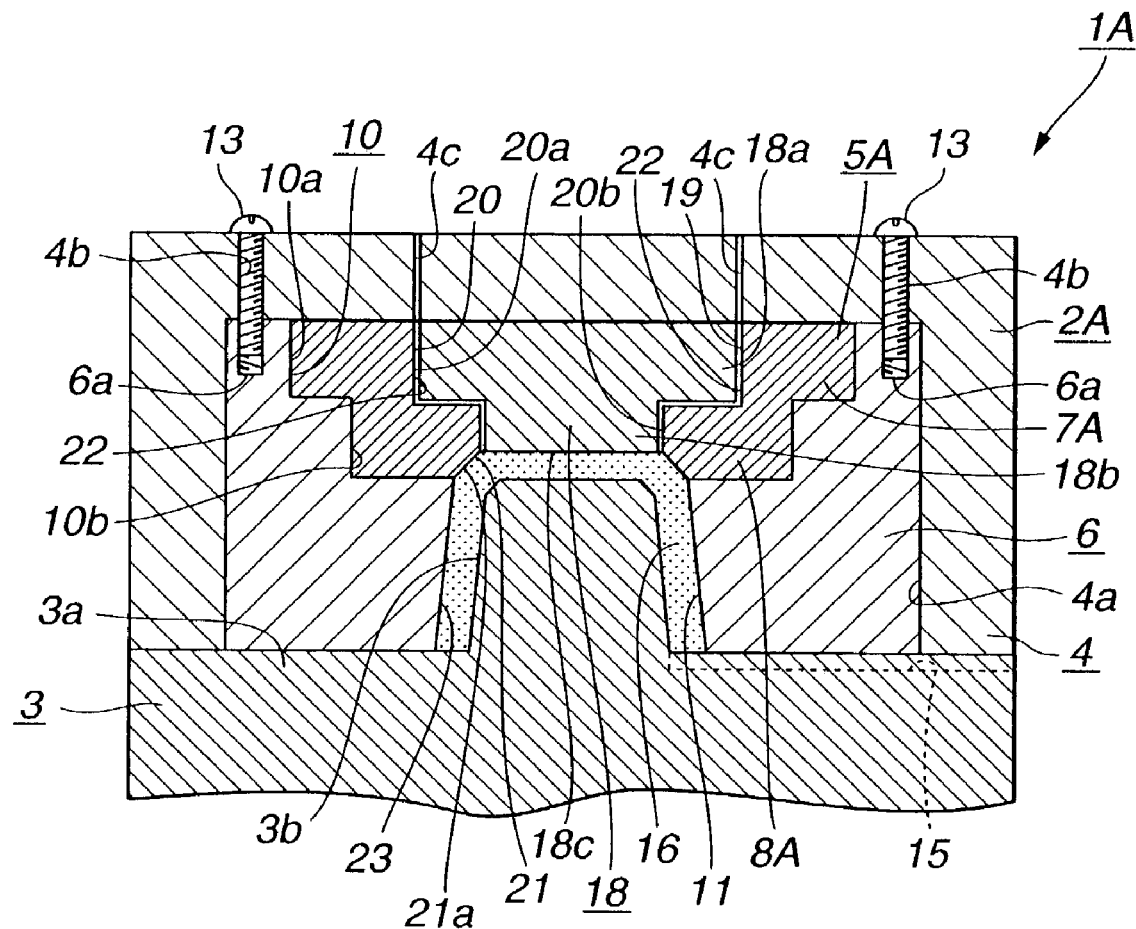
FIG. 20 is a cross-sectional view showing the state in which a molding material has been charged into the cavity.

The molding material 16 then is charged into the cavity 14 through a runner 15, as shown in FIG. 20. In charging the molding material 16, air or gases are vented to outside via plural gas vents 22 and through plural degassing holes 4c of the base mold 4. By this degassing, so-called gas burning of the first to third forming molds 5A, 6 or 18, or the blistering, hazing or cracking on the surface of the molded product may be prevented for occurring.

Figure 21:
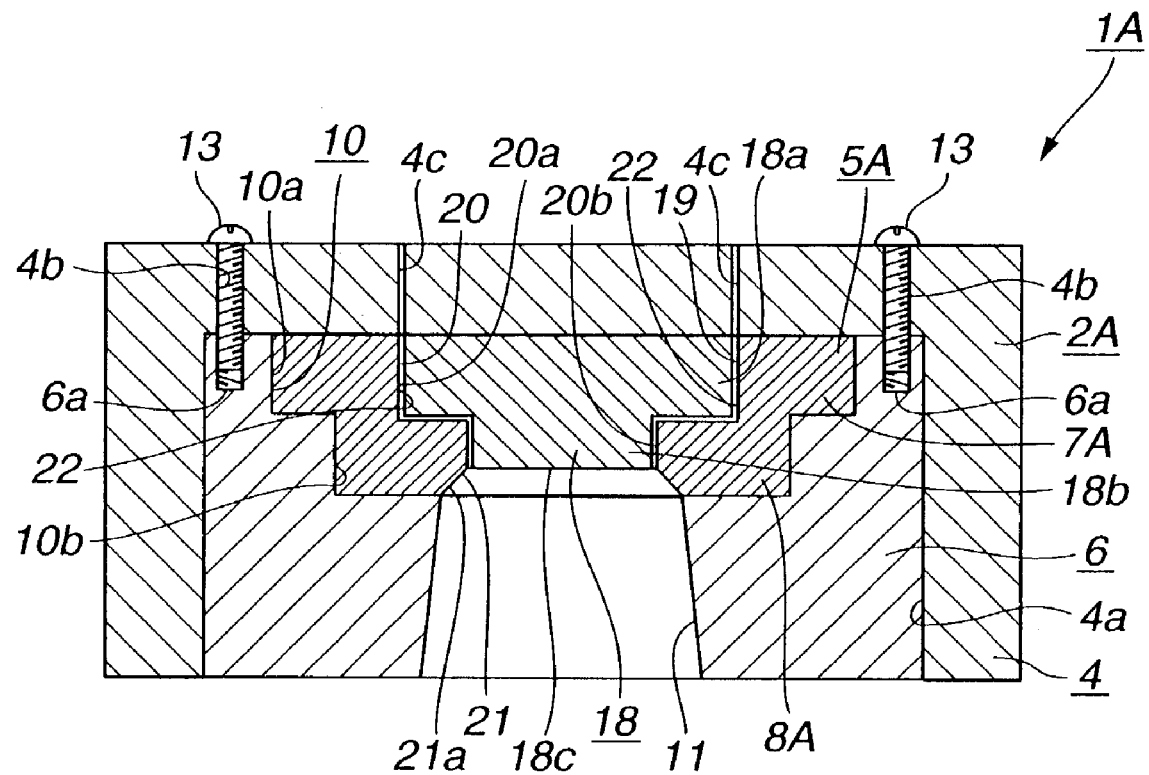
FIG. 21 is a cross-sectional view showing the state in which the molded article has been prepared and the metal mold for forming has been opened.
Figure 21:
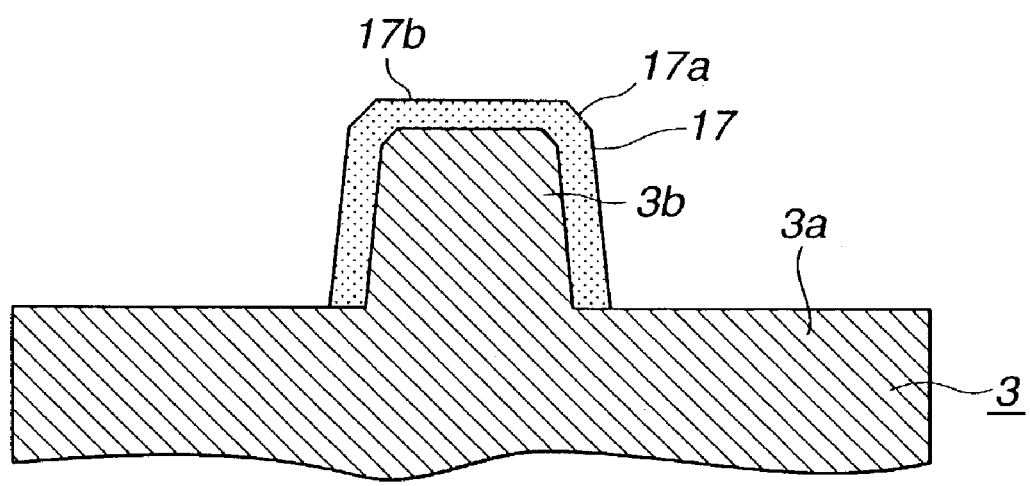

When the molding material 16 is cooled and cured, a molded product 17 is finished. So, the movable mold 2A is uplifted to open the forming metal mold 1A, as shown in FIG. 21. The molded product 17 is left in the core portion 3b of the fixed mold 3, as shown in FIG. 12. The molded product 17 is ejected by a knock-out pin, not shown, to dismount the molded product 17 from the fixed mold 3 to complete the entire take-out process.

On the upper edge surface of the molded product 17, a transcribed portion 17a, corresponding to the transfer surface 21a of the first forming mold 5A, is formed, as shown in FIG. 13. The transcribed portion 17a has a smooth and lustrous mirror surface. Moreover, in the end face 17b of the molded product 17, there are formed spin marks corresponding to the transfer surface 18c of the third forming mold 18, as shown in FIG. 13.

With the forming metal mold 1A according to the present invention, in which the first forming mold 5A having the transfer surface 21a and the third forming mold 18 having the transfer surface 18c are formed, without forming a plating layer by electroplating on the master surface, with the first forming mold 5A and the third forming mold 18 serving as constituent elements of the forming metal mold 1A, it is possible to reduce both the manufacturing time and cost of the forming metal mold 1A.

It is to be noted that the specified shape and structure of the respective portions in the above-described embodiment represent merely an illustration in carrying out the present invention That is, the present invention has been disclosed in the perspective of illustration and hence the scope of the present invention should be defined only in light of the claims without being construed in a limiting fashion.

Industrial Applicability

The forming metal mold of the present invention includes, as a constituent element of the forming metal mold, a first forming mold having a transfer surface, in which the first forming mold is formed without forming a plating layer by electroplating on the surface of a master, with the result that it is possible to reduce the manufacturing time period for the forming metal mold and the manufacturing cost significantly.

Moreover, in the forming metal mold of the present invention, since the transfer surface is formed in continuation to the opening edge of the molding recess, the device used for forming the transfer surface can be readily inserted into the molding recess to facilitate and optimize the transfer surface forming processing operations.

In the manufacturing method for a forming metal mold according to the present invention, a first forming mold having a transfer surface is formed without forming a plating layer by electroplating on the master surface, the first forming mold is combined with the second forming mold and the first and second forming molds thus combined together are secured to the base mold, with the result that it is possible to reduce the manufacturing time period for the forming metal mold and the manufacturing cost significantly.

In addition, the molded article prepared using the forming metal mold according to the present invention is molded using a first forming mold having a transfer surface formed without forming a plating layer by electroplating on the master surface, it is possible to reduce the manufacturing cost of the molded article significantly.

What is claimed is:

1. A forming metal mold for use with a fixed mold, the forming metal mold comprising:
    a base mold having a positioning recess formed therein;
    a first forming mold having a molding recess and being separate and apart from said base mold;
    a second forming mold having an inserting recess formed therein with said separate first forming mold arranged in said inserting recess and having a charged opening communicating with said molding recess, wherein said second forming mold is inserted into said positioning recess of said base mold and secured thereto with said first forming mold captured therebetween; and
    a transfer surface section formed on an opening edge surface of said molding recess of said first forming mold for transcribing a decoration thereon onto a surface of a molded article, wherein
    said molding recess and said charged opening define a cavity into which a core portion of the fixed mold is inserted.

2. The forming metal mold according to claim 1 wherein said transfer surface section includes a mirror surface section for transcribing a mirror surface to the surface of said molded article.

3. The forming metal mold according to claim 1 wherein an interstice operating as a gas vent is formed between said first and second forming molds.

4. The forming metal mold according to claim 1 wherein said first forming mold comprises:
    a first forming section including an opening communicating with said transfer surface section formed in the opening edge surface of said molding recess; and
    a second forming section inserted from a side opposite said transfer surface section facing said opening, wherein said second forming section has a second transfer surface section defining a portion of said cavity.

5. A forming metal mold for use with a fixed mold, the forming metal mold comprising:
    a base mold having a positioning recess formed therein;
    a first forming mold having a molding recess and being separate and apart from said base mold;
    a second forming mold having an inserting recess formed therein and having a charged opening communicating with said molding recess, wherein said first forming mold is inserted into said molding recess;
    a first transfer surface section formed on one end of said molding recess of said first forming mold for transcribing a decoration thereon onto a surface of a molded article; and
    a third forming mold arranged in said molding recess of said first forming mold, wherein said second forming mold is inserted into said positioning recess of said base mold and secured to said base mold with said first and third forming molds captured between said second forming mold and said base mold and having a second transfer surface section in continuation to said transfer surface section, wherein
    said charged opening and the first and second transfer surface sections define a cavity into which a core portion of the fixed mold is inserted.

6. The forming metal mold according to claim 5 said first transfer surface section includes a mirror surface section for transcribing a mirror surface to the surface of said molded article.

7. The forming metal mold according to claim 5 said second transfer surface section includes a spin mark section for transcribing spin marks to the surface of said molded article.

8. The forming metal mold according to claim 5 wherein an interstice operating as a gas vent is formed between said first and third forming molds.

9. A method for manufacturing a forming metal mold for use with a fixed mold, comprising the steps of:
    forming a transfer surface section for transcribing a decoration to a surface of a molded article on an opening edge of molding recess formed in a first forming mold;
    combining a second forming mold having an inserting recess and a charged opening, with said first forming mold inserted in said inserting recess, so that the molding recess continues to said charged opening; and
    inserting the combined first and second forming molds into a positioning recess of a base mold and securing the second forming mold to the base mold, so that a cavity is defined by said molding recess and said charged opening, wherein a core portion of the fixed mold is inserted into the cavity.

10. The manufacturing method according to claim 9 further comprising the step of forming a mirror surface section on an opening edge of the molding recess formed in said first forming mold for transcribing a mirror surface to the surface of the molded article.

11. A method for manufacturing a forming metal mold for use with a fixed mold, comprising the steps of:
    forming a first transfer surface section on one end of a molding recess of a first forming mold for transcribing a decoration to a surface of a molded article;
    introducing a second forming mold from an opposite end of said molding recess of said first forming mold; and
    securing a third forming mold having a charged opening to a base mold, such that said first and second forming molds are clamped in position between said third forming mold and said base mold, so that a second transfer surface section formed in said second forming mold continues to said first transfer surface section and so that said charged opening continues to said first transfer surface section, wherein said charged opening and said first and second transfer surface sections define a cavity into which is inserted a core portion of the fixed mold.

12. The manufacturing method according to claim 11 further comprising forming a mirror surface section on an opening edge of the molding recess formed in said first forming mold for transcribing a mirror surface to the surface of the molded article.

* * * * *

UNITED STATES PATENT AND TRADEMARK OFFICE
CERTIFICATE OF CORRECTION

| | |
|---|---|
| PATENT NO. | : 7,052,264 B2 |
| APPLICATION NO. | : 10/257427 |
| DATED | : May 30, 2006 |
| INVENTOR(S) | : Yoshihiro Sudo et al. |

It is certified that error appears in the above-identified patent and that said Letters Patent is hereby corrected as shown below:

On the Title page, Item (73) in the Assignee section, please add --Suzuki Seiki Industry Co., Inc--.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,052,264 B2 |
| APPLICATION NO. | : 10/257427 |
| DATED | : May 30, 2006 |
| INVENTOR(S) | : Yoshihiro Sudo et al. |

It is certified that error appears in the above-identified patent and that said Letters Patent is hereby corrected as shown below:

This certificate supersedes the Certificate of Correction issued November 4, 2008. The certificate should be vacated since no Certificate of Correction was granted for this patent number.

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,052,264 B2
APPLICATION NO. : 10/257427
DATED : May 30, 2006
INVENTOR(S) : Yoshihiro Sudo et al.

It is certified that error appears in the above-identified patent and that said Letters Patent is hereby corrected as shown below:

Title Page

Item (73) Assignee should read --Sony Corporation, Tokyo (JP) and Suzuki Seiki Industry Co., Inc., Tokyo (JP)--.

Signed and Sealed this

Nineteenth Day of May, 2009

JOHN DOLL
*Acting Director of the United States Patent and Trademark Office*